United States Patent [19]
Ogino

[11] Patent Number: 5,768,226
[45] Date of Patent: Jun. 16, 1998

[54] INFORMATION RECORDING AND/OR REPRODUCING METHOD AND APPARATUS IN WHICH SEEK OF A RECORDING AND/ OR REPRODUCING HEAD IS CORRECTED ON THE BASIS OF DETECTED MOVING VELOCITY

[75] Inventor: Tsukasa Ogino, Yokohama, Japan

[73] Assignee: Canon Kabushiki Kaisha, Tokyo, Japan

[21] Appl. No.: 669,648

[22] Filed: Jun. 24, 1996

Related U.S. Application Data

[63] Continuation of Ser. No. 172,056, Dec. 23, 1993, abandoned.

[30] Foreign Application Priority Data

Dec. 28, 1992 [JP] Japan ................... 4-358745
Dec. 28, 1992 [JP] Japan ................... 4-358746

[51] Int. Cl.$^6$ ................... G11B 7/00; G11B 5/596
[52] U.S. Cl. ................... 369/44.28; 369/44.32; 369/54; 360/78.05
[58] Field of Search ................... 369/44.28, 44.32, 369/54, 47, 48, 50, 58, 44.25, 44.27; 360/78.01, 78.04, 78.05, 78.06

[56] References Cited

U.S. PATENT DOCUMENTS

| | | | |
|---|---|---|---|
| 467,039 | 12/1892 | Meyer | 369/44.28 |
| 5,090,001 | 2/1992 | Ito et al. | 369/44.28 |
| 5,117,410 | 5/1992 | Akiyama | 369/44.28 |
| 5,260,923 | 11/1993 | Babo | 369/54 |
| 5,317,550 | 5/1994 | Semba | 369/44.28 |

FOREIGN PATENT DOCUMENTS

| | | |
|---|---|---|
| 0277799 | 8/1988 | European Pat. Off. . |
| 0456371 | 11/1991 | European Pat. Off. . |
| WO89 08917 | 9/1989 | WIPO . |

OTHER PUBLICATIONS

Patent Abstracts of Japan, Kokai No. 01-048275, vol. 13, No. 250, Feb. 1989.

*Primary Examiner*—Paul W. Huber
*Attorney, Agent, or Firm*—Fitzpatrick, Cella, Harper & Scinto

[57] ABSTRACT

In an information recording/reproducing apparatus, a head is moved across tracks on a recording medium to thereby perform a coarse seek to a position near a target position. A recording/reproducing portion of the head is moved in the track intersection direction to thereby perform a fine seek to the target position. A moving velocity of the portion of the head with respect to the medium is detected by a first detector. A target moving velocity is caluculated in accordance with a remaining distance to the target position of the portion of the head. A moving displacement or moving velocity of the portion of the head is detected by a second detector. A detection value from the first detector is corrected on the basis of a detection value from the second detector to eliminate a variation component generated by a disturbance of the portion of the head.

16 Claims, 11 Drawing Sheets

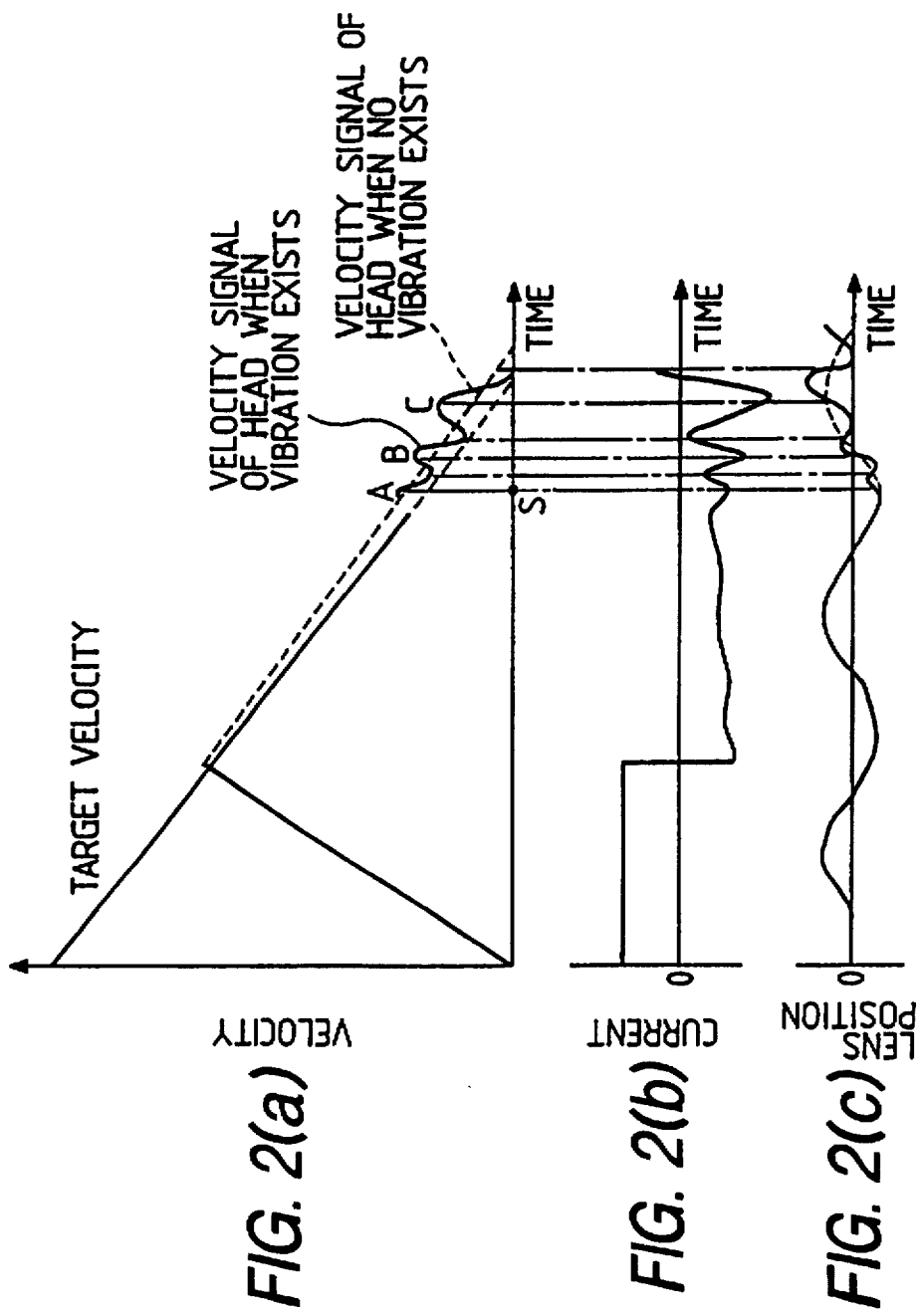

INFORMATION RECORDING AND/OR REPRODUCING METHOD AND APPARATUS IN WHICH SEEK OF A RECORDING AND/OR REPRODUCING HEAD IS CORRECTED ON THE BASIS OF DETECTED MOVING VELOCITY

This application is a continuation of application Ser. No. 08/172,056, filed Dec. 23, 1993, now abandoned.

BACKGROUND OF THE INVENTION

1. Field of the Invention

The present invention relates to an information recording/reproducing apparatus for recording/reproducing information by using an information recording medium such as a magnetic disk or magnetooptical disk and, more particularly, to a velocity controller which is used to cause a recording/reproducing head to seek to a target position.

2. Related Background Art

Conventionally, in order to record/reproduce information at a target position of a recording medium in an information recording/reproducing apparatus, a recording/reproducing head must be moved to the target position. In this seek operation of the recording/reproducing head, the velocity of the head must be efficiently controlled to quickly and exactly move the head to the target position. A velocity control system generally used to control such a recording/reproducing head is as follows. An operation schedule (velocity profile) is previously set. The velocity of the head during the operation is detected and controlled according to the operation schedule. FIG. 1(a) and 1(b) is are graph showing a typical control system. Referring to FIGS. 1(a) and 1(b), $V_{ref}$ is a reference velocity representing an operation schedule velocity, and $V_n$ is a velocity detected during the seek operation. The relationship between the velocity profile and an applied current for a coarse actuator (linear motor) for driving a carriage for moving the head is also shown in FIGS. 1(a) and 1(b). The reference velocity $V_{ref}$ is calculated in accordance with a remaining distance to the target and represented by the following equation.

$$V_{ref}=[2\cdot\alpha(S-\lambda/2\cdot N)]^{1/2} \quad (1)$$

where S is the moving distance to the target, $\lambda$ is the track pitch, $\alpha$ is the deceleration/acceleration, and N is the zero crossing count value from which the moving distance is obtained. When the velocity of the head is controlled, a command value to the linear motor is calculated every predetermined period from the target velocity $V_{ref}$ and the current velocity $V_n$ at that time, and feedback is performed such that the velocity of the head follows the target velocity. The command value $A_{ct}$ to the linear motor is calculated in accordance with the following equation.

$$A_{ct}=K(V_{ref}-V_n) \quad (2)$$

where K is a feedback gain. As shown in FIGS. 1(a) and 1(b), first of all, an acceleration current is supplied to the linear motor to accelerate the head. When the target velocity is reached, a deceleration current is supplied to the linear motor, and the head is decelerated while following the target velocity. When the target position is reached, the velocity becomes 0, thereby finishing the seek operation.

When the velocity of the recording/reproducing head is to be detected, different detection methods are used based on the velocity range. In more detail, in the high velocity range, a track count method is used, in which the velocity is detected from the number of tracks N intersected by the head in a predetermined sampling interval $T_s$. The velocity $V_n$ according to this track count method is calculated in accordance with the following equation.

$$V_n=(\lambda/2\cdot N)/T_s \quad (3)$$

On the other hand, in the low velocity range, an intertrack count method is used, in which the zero crossing points of a tracking error signal are detected, and the velocity is detected from a time $T_d$ between the zero crossing points. More specifically, since the distance between the zero crossing points is ½ the track pitch $\lambda$, the velocity can be detected by measuring the passing time of the ½ pitch. The velocity $V_n$ at this time is represented by the following equation.

$$V_n=(\lambda/2)/T_d \quad (4)$$

These two velocity detection methods are selected in accordance with a predetermined reference velocity. When the velocity of the head is higher than the reference velocity, the detection method is switched into the track count method corresponding to the high velocity range. When the velocity of the head is lower than the reference velocity, the detection method is switched into the intertrack count method corresponding to the low velocity range.

Conventionally, for example, when a light beam is to access the target position in optical recording, the recording/reproducing head is moved and driven by the coarse actuator. To cause the light beam to access a target track, an objective lens in the head is further moved by a fine actuator, thereby causing the light beam to exactly access the target track. The fine actuator here is a linear motor for roughly moving the head to a position near the target. Generally, a so-called two-stage actuator structure comprising coarse and fine actuators is used. However, in the two-stage actuator, the fine actuator is arranged on the linear motor, and the linear motor itself is relatively heavy. For this reason, when the linear motor starts or stops, the fine actuator vibrates. Therefore, the detected relative velocity of the head varies, which interferes with velocity control of the coarse actuator. In the worst case, the velocity control loop oscillates.

This problem will be described in detail with reference to FIGS. 2(a) through 2(c). FIG. 2(a) is a graph showing the relationship between the target velocity and the detected velocity. The velocity detected when vibration of the fine actuator exists and that detected when no vibration exists are shown in of FIG. 2(a). FIG. 2(b) is a graph showing a driving current for the linear motor corresponding to the velocity in FIG. 2(a), and FIG. 2(c) is a graph showing the position of the objective lens moved by the fine actuator. When no vibration of the fine actuator exists, the velocity of the head follows the target velocity to perform a satisfactory seek operation, as shown in FIG. 2(a). However, when the fine actuator is vibrated at a point S due to a disturbance such as stopping of the linear motor, a vibration component is applied to the head, and the objective lens is set in a vibrated state, as shown in FIG. 2(c). The movement of the objective lens caused due to the vibration directly affects detection of the relative velocity of the head and the surface of the recording medium. The detected velocities A, B, and C include the vibration component, as shown in FIG. 2(a). As described above, when the fine actuator vibrates, not the actual velocity of the head but the velocity generated by the vibration of the objective lens is detected. At this time, since the velocity control system controls the velocity to follow the target velocity, velocity control becomes unstable, and in the worst case, the velocity control loop oscillates.

Conventionally, a recording medium having a disk-like shape has an influence of eccentricity caused upon rotation of the disk. For this reason, when viewed from the fixed head, the track is shifted by eccentricity in synchronism with rotation. During the seek movement of the head, the relative velocity between the head and the disk is detected as a track shift caused by eccentricity. In addition to the vibration of the lens, this also makes velocity control unstable.

SUMMARY OF THE INVENTION

The present invention has been made to solve the above problems, and has as its object to provide an information recording/reproducing apparatus which corrects variations in seek-detected velocity caused by eccentricity of a recording medium or vibrations of a fine actuator, thereby performing stable seek control.

The object of the present invention is achieved by an information recording/reproducing apparatus having first moving means for performing a coarse seek of a recording/ reproducing head in a track intersection direction of an information recording medium, second moving means for performing a fine seek of a recording/reproducing portion of the head to a target position after the coarse seek, first detecting means for detecting a seek velocity of the recording/reproducing portion of the head, means for calculating a target seek velocity in accordance with a remaining distance to the target position, and control means for controlling the first and second moving means on the basis of the detected velocity and the target velocity to cause the recording/reproducing portion of the head to seek the target position, characterized by comprising second detecting means for detecting a moving displacement or moving velocity of the recording/reproducing portion with respect to the first moving means, and correcting means for correcting a detection value from the first detecting means on the basis of a detection value from the second detecting means to remove a variation component of the detected seek velocity which is caused by a vibration of the recording/reproducing portion.

The object of the present invention is also achieved by an information recording/reproducing apparatus having first moving means for performing a coarse seek of a recording/ reproducing head in a track intersection direction of an information recording medium, second moving means for performing a fine seek of a recording/reproducing portion of the head to a target position after the coarse seek, first detecting means for detecting a seek velocity of the recording/reproducing portion of the head, means for calculating a target seek velocity in accordance with a remaining distance to the target position, and control means for controlling the first and second moving means on the basis of the detected velocity and the target velocity to cause the recording/reproducing portion of the head to seek the target position, characterized by comprising means for detecting an eccentric component of the information recording medium, second detecting means for detecting a moving velocity of the recording/reproducing portion with respect to the first moving means, and correcting means for correcting a detection value from the seek velocity detecting means on the basis of detection values from the eccentric component detecting means and the second detecting means to remove an eccentric component of the recording medium and a variation component of the recording/reproducing portion from the detected velocity by the first detecting means.

BRIEF DESCRIPTION OF THE DRAWINGS

FIGS. 2(a) through 2(c) are charts for explaining a problem of conventional velocity control;

DETAILED DESCRIPTION OF THE PREFERRED EMBODIMENTS

Figure 1A:
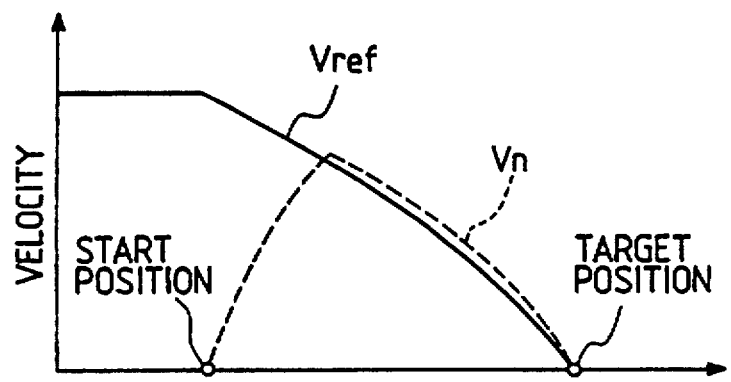
FIGS. 1(a) and 1(b) are graphs for explaining a typical velocity control system of a recording/reproducing head.
Figure 1B:
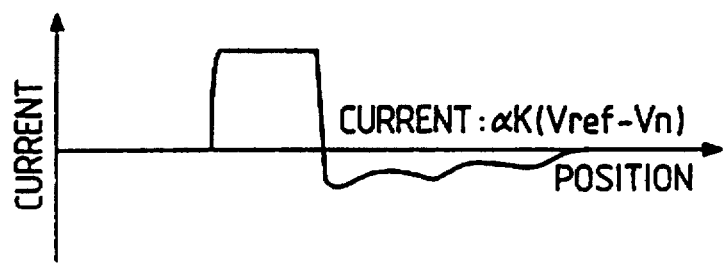
Figure 3:
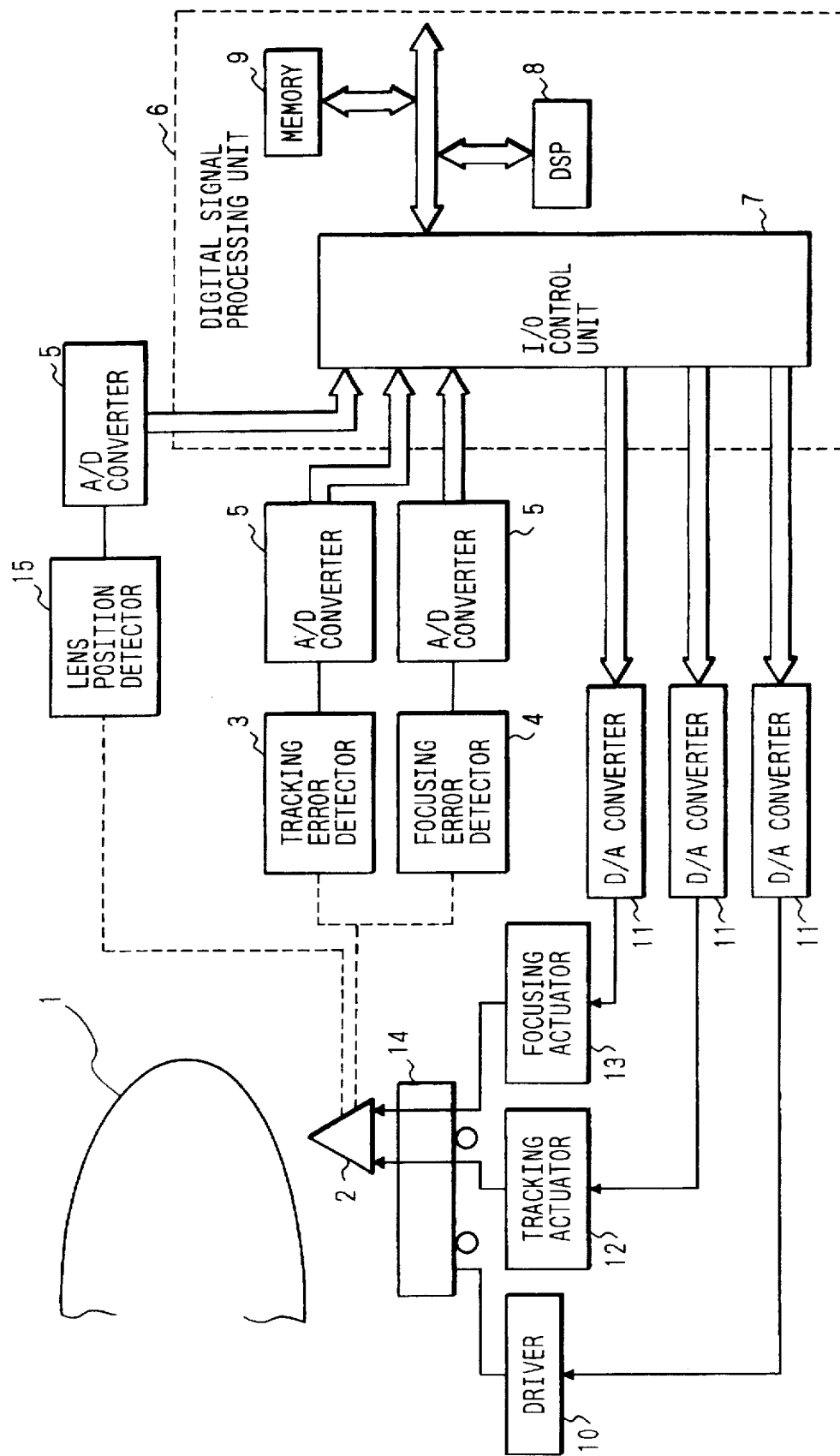
FIG. 3 is a block diagram showing an information recording/reproducing apparatus according to the first embodiment of the present invention.

An embodiment of the present invention will be described below in detail with reference to the accompanying drawings. FIG. 3 is a block diagram showing an information recording/reproducing apparatus according to the first embodiment of the present invention. This embodiment will exemplify an optical disk recording/reproducing apparatus using an optical disk as a recording medium. Referring to FIG. 3, an optical disk 1 serving as an information recording medium is rotated by a driving system (not shown) at a predetermined velocity. An optical system 2 optically records information on the optical disk 1, or reproduces the recorded information from the optical disk 1. The optical system 2 is constituted by various optical elements such as a semiconductor laser serving as a light source for recording/ reproduction, an objective lens for focusing a laser beam from the semiconductor laser into a very small spot and radiating it on the optical disk 1, and a sensor for detecting light reflected by the optical disk 1. A tracking actuator 12 moves the objective lens in the optical system 2 in the radial direction of the optical disk 1. A focusing actuator 13 moves the objective lens in the vertical direction with respect to the surface of the optical disk 1. These two actuators 12 and 13 and the optical system 2 are integrally formed as an optical head to be movable in the radial direction of the optical disk 1. A linear motor 14 moves the optical head in the radial direction of the optical disk 1. A driver 10 drives the linear motor 14.

A tracking error detector 3 detects a tracking error signal on the basis of an output from the sensor in the optical system 2. A focusing error detector 4 detects a focusing error signal on the basis of an output from the sensor. A lens position detector 15 detects the lens position in the radial direction of the focusing objective lens. The error and lens position signals detected by these detectors are respectively converted into digital signals by A/D convertors 5 and transmitted to a digital signal processing unit 6.

The digital signal processing unit 6 is a digital control unit serving as the main control unit of the optical disk recording/reproducing apparatus. The digital signal processing unit 6 is constituted by an I/O control unit 7 for controlling an input/output of a signal, a digital signal processor (to be abbreviated as a DSP hereinafter) 8 for executing arithmetic processing required for control according to a predetermined control program, and a memory 9 for storing various data. This digital signal processing unit 6 performs tracking or focusing control of the light beam by controlling the tracking or focusing actuator 12 or 13, control of a seek operation for moving the optical head to a designated position, and control of information recording/reproduction at the designated position, thereby controlling the recording/reproducing operation of the entire apparatus. D/A converters 11 convert digital command values calculated by the DSP 8 during seek control of the optical head into analog values and output them to the actuators 12 and 13, and the driver 10.

Figure 4:
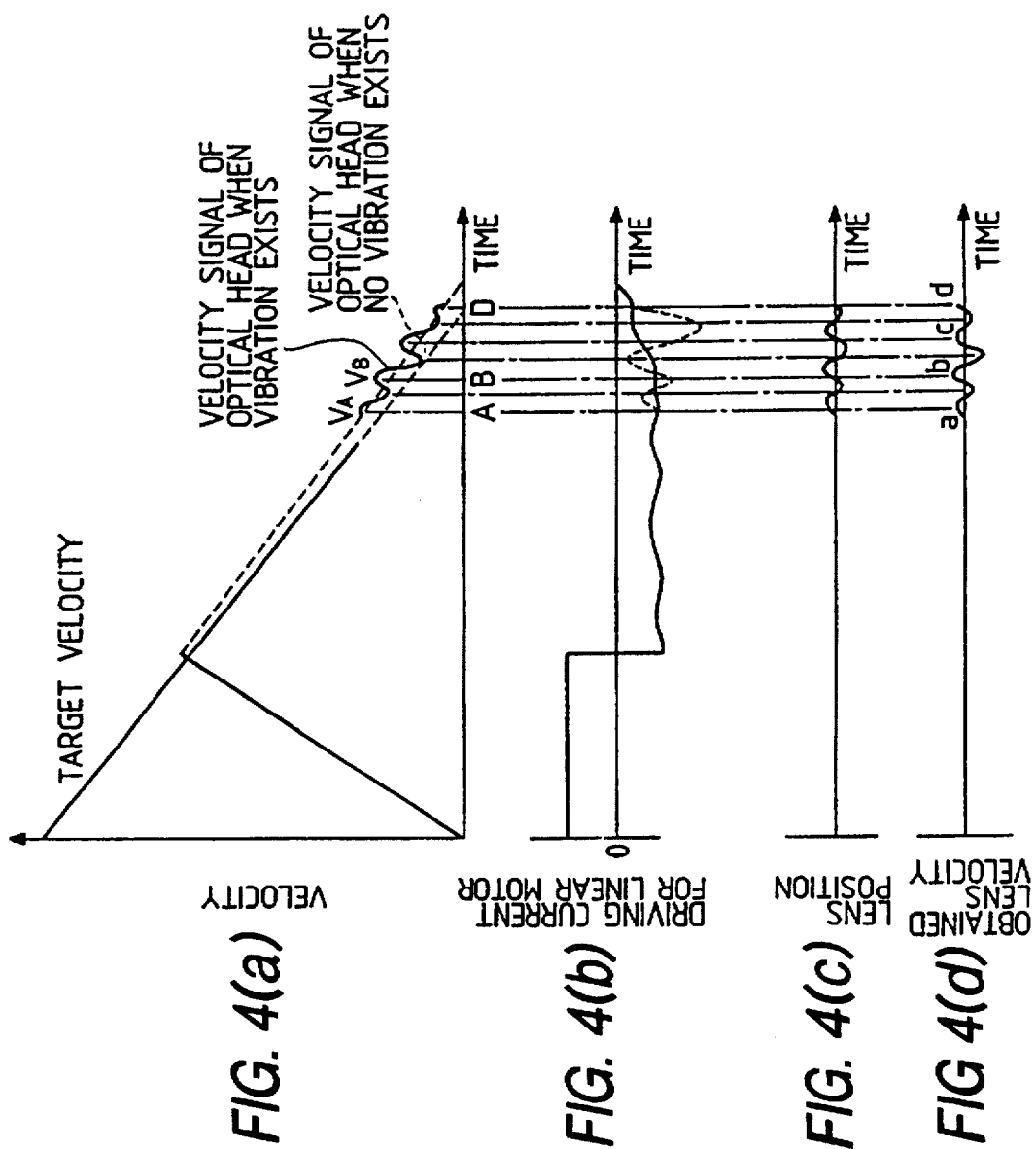
FIGS. 4(a) through 4(d) are timing charts showing the relationship between a target velocity and a detected velocity, a driving current for a linear motor, an output from a lens position detector, and a lens velocity in the first embodiment in FIG. 3.
Figure 5:
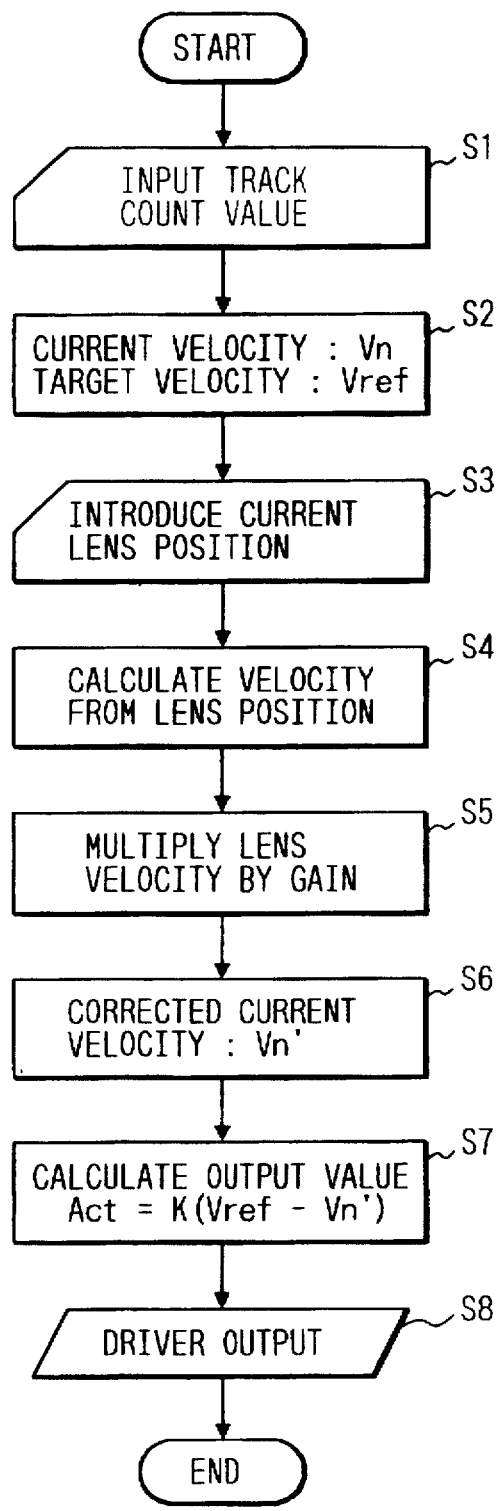
FIG. 5 is a flow chart showing a velocity control operation in the first embodiment in FIG. 3.

An operation will be described below with reference to FIGS. 4(a) through 4(d) and 5. FIGS. 4(a) through 4(d) are charts showing a signal of each portion during the seek operation of the optical head. FIG. 4(a) is a chart showing a velocity profile (operation schedule velocity curve to a target position) during the seek operation and an actually detected velocity signal. Two velocity signals are shown in FIG. 4(a). One is a velocity signal obtained when the tracking actuator 12 is vibrated, and the other is a signal obtained when no vibration exists. FIG. 4(b) shows a driving current for the linear motor 14 during the seek operation, FIG. 4(d) shows a lens position detected by the lens position detector 15, and (d) of FIG. 4 shows a lens velocity obtained from the DSP 8 on the basis of the detection value from the lens position detector 15. FIG. 5 is a flow chart showing the process of the DSP 8 during the seek operation of the optical head, and shows the interrupt routine of the velocity control executed at a period of 4 kHz.

When a recording/reproducing command is issued from an external controller (not shown) and the recording/reproduction position of the optical disk 1 is designated, the digital signal processing unit 6 calculates a remaining distance from the current position and the target position of the optical head to start control of the seek operation to the target position. In velocity control during the seek operation, the DSP 8 detects the velocity of the optical head as described above, and calculates the command value to the linear motor 14 every predetermined period on the basis of the obtained velocity and the target velocity to execute velocity control of the optical head. In more detail, as shown in FIG. 5, the DSP 8 inputs, from a counter (not shown), a track count value which is the number of information tracks of the optical disk 1 intersected by the light beam (S1), and calculates a current velocity $V_n$ and a target velocity $V_{ref}$ on the basis of the track count value (S2). Calculation of the current velocity $V_n$ is performed by the track count method in the low velocity range or the intertrack count method in the high velocity range as described above. The DSP 8 calculates the target velocity $V_{ref}$ in accordance with equation (1) on the basis of the track count value. However, for example, assuming that the track count value is $N_2$, the target velocity $V_{ref}$ is represented by the following equation.

$$V_{ref} = [2 \cdot (S-N_2) \cdot \lambda/2]^{1/2} \quad (5)$$

where S is the total number of jumps to the target track.

The DSP 8 corrects the detected velocity in steps S3 to S6, i.e., corrects a variation component of the detected velocity generated by vibration of the actuator and calculates the command value to the linear motor 14 by using the obtained corrected value (S7). The command value is calculated in accordance with equation (2), converted into an analog value by the D/A converter 11, and transmitted to the driver 10 to drive the linear motor 14. The correction process of the detected velocity will be described later in detail. The DSP 8 repeatedly executes a series of operations in steps S1 to S8. As a result, an acceleration current is supplied to the linear motor 14, as shown in FIG. 4(b), and the optical head is accelerated to the target velocity, as shown in FIG. 4(a). When the target velocity is reached, a deceleration current is supplied to the linear motor 14, and the optical head is decelerated while following the target velocity.

Assume that the tracking actuator 12 is vibrated by some disturbance at a point A in FIG. 4(a). By the vibration, the objective lens arranged in the optical system 2 is not fixed at the center and is set into a vibrated state, as shown in FIG. 4(c). The DSP 8 corrects the detected velocity in the vibrated state in the series of control operations described above. In more detail, after calculations of the current velocity and the target velocity, the DSP 8 introduces an output from the lens position detector 15 (S3), and calculates the lens velocity on the basis of the lens position (S4). This can be obtained as a difference between the previously introduced lens position and the newly introduced lens position. The DSP 8 then multiplies the obtained value by the correction gain of the detected velocity by the lens velocity (S5), and corrects the detected velocity $V_n$ by a lens velocity $V_L$ (S6). The corrected velocity $V_n'$ is represented by the following equation.

$$V_n' = V_n - k \cdot V_L \quad (6)$$

where k represents the correction gain which is an arbitrary constant.

The DSP 8 corrects the detected velocity, calculates the command value to the linear motor 14 by using the obtained corrected value $V_n'$ (S7), and outputs it to the driver 10 (S8). The correction gain K is not always a fixed value, but the correction gain K may be varied. For example, if the correction gain K is successively varied according to vibration characteristics of the actuator, the velocity correction can be preferably effected. For example, a velocity $V_A$ is detected at the point A and a velocity $V_B$ is detected at a point B because of the vibration of the actuator. As shown in FIG. 4(d), when lens velocities a and b are subtracted from the detected velocities $V_A$ and $V_B$, respectively, the corrected velocities can be calculated. Therefore, the obtained corrected velocity is an exact relative velocity between the optical head and the surface of the disk, and the vibration component of the objective lens is eliminated. At a point D in FIG. 4(a), the DSP 8 switches the detection method of the optical head velocity from the track count method to the intertrack count method. When several tens of tracks remain up to the target, coarse-seek control of the optical head by the linear motor 14 is switched to fine-seek control of the light beam by the tracking actuator 12. When the light beam reaches the target track, the light beam is finally focused on the target track to record/reproduce information on/from the target track.

As described above, in this embodiment, the lens velocity in the vibrated state of the actuator is detected on the basis of the output from the lens position detector for detecting the position of the objective lens. When the lens velocity is subtracted from the detected current velocity, the vibration component of the actuator can be eliminated, thereby obtaining a correct velocity. More specifically, when the actuator is vibrated, the velocity $V_A$ or $V_B$ including the vibration component is detected, as shown in FIG. 4(b). However, by eliminating the vibration component, a correct velocity can be detected. Even when the actuator vibrates, the vibration of the current as indicated by a broken line in FIG. 4(b) is eliminated. Therefore, no instability occurs in velocity control so that stable velocity control can be performed.

Figure 6:
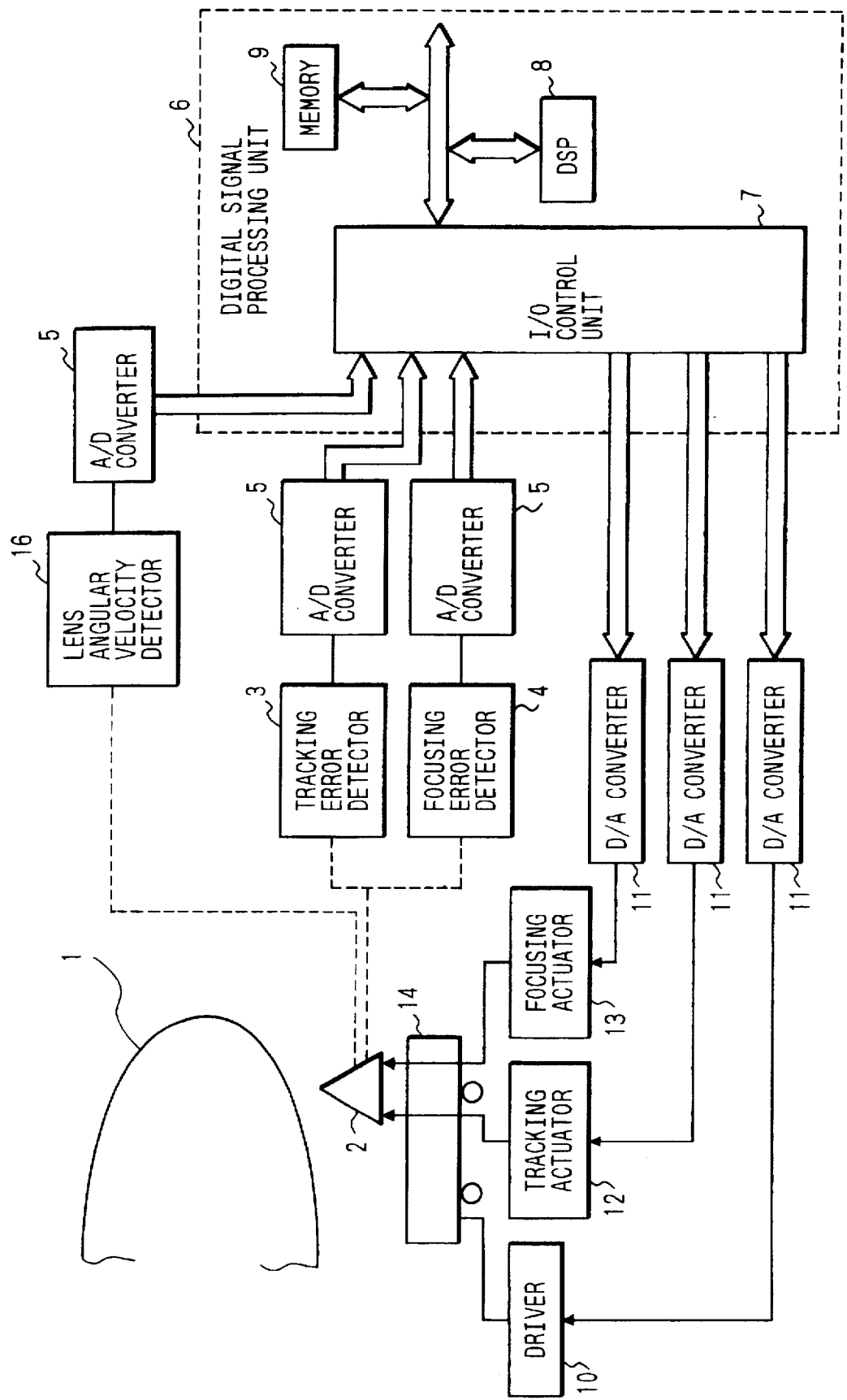
FIG. 6 is a block diagram showing the second embodiment of the present invention.

FIG. 6 is a block diagram showing the second embodiment of the present invention. In the first embodiment shown in FIG. 3, the velocity of the objective lens is detected on the basis of the output from the lens position detector. However, in the second embodiment, the lens velocity is detected from, e.g., the angular velocity of a displacement of the vibrated objective lens. Referring to FIG. 6, a lens angular velocity detector 16 detects an angular velocity in the rotational direction of the objective lens arranged in an optical system 2. The angular velocity detected by the lens angular velocity detector 16 is introduced by a DSP 8 in a digital signal processing unit 6 and used to correct the velocity of the optical head (to be described later in detail). Other arrangements are the same as in FIG. 3.

Figure 7:
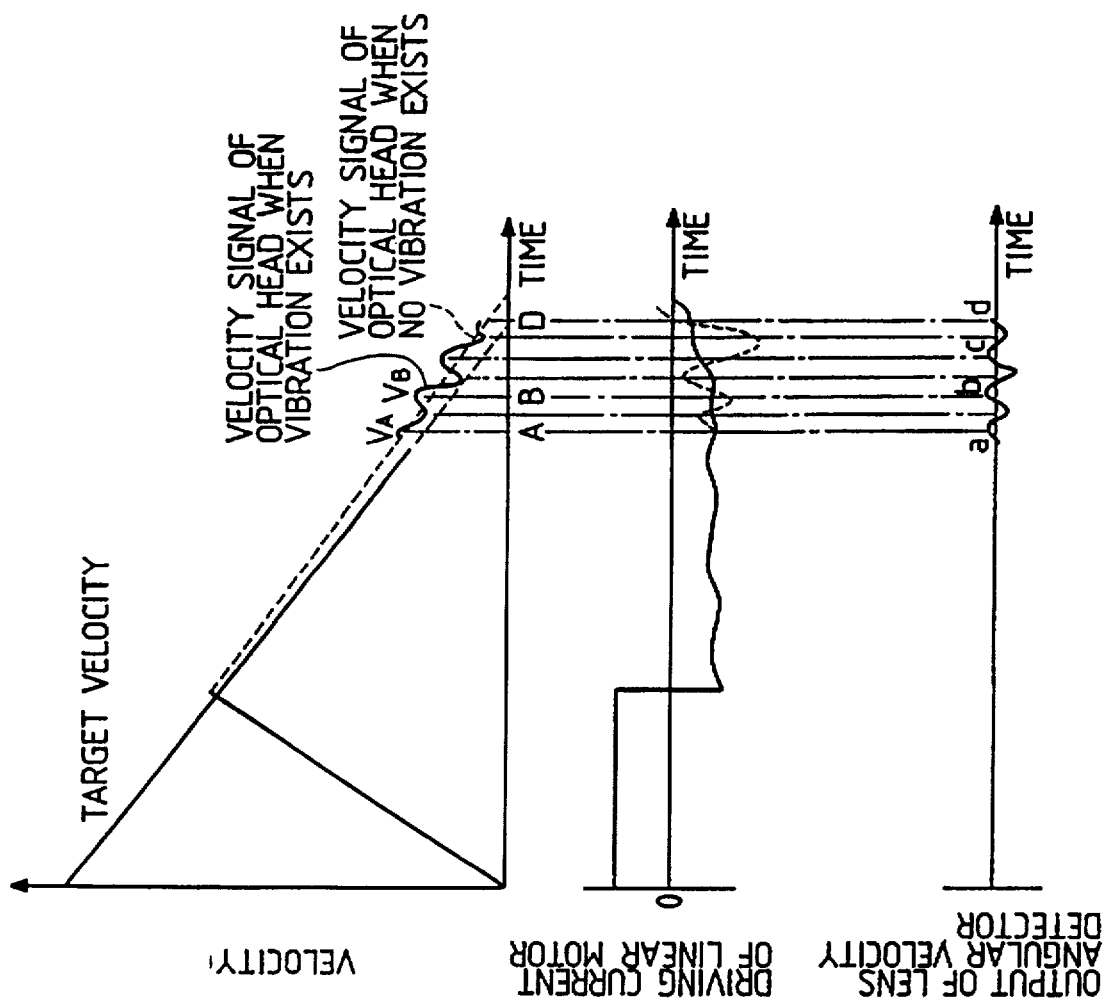
FIGS. 7(a) through 7(c) are timing charts showing the relationship between a target velocity and a detected velocity, a driving current for a linear motor, and an output from a lens angular velocity detector in the second embodiment in FIG. 6.
Figure 8:
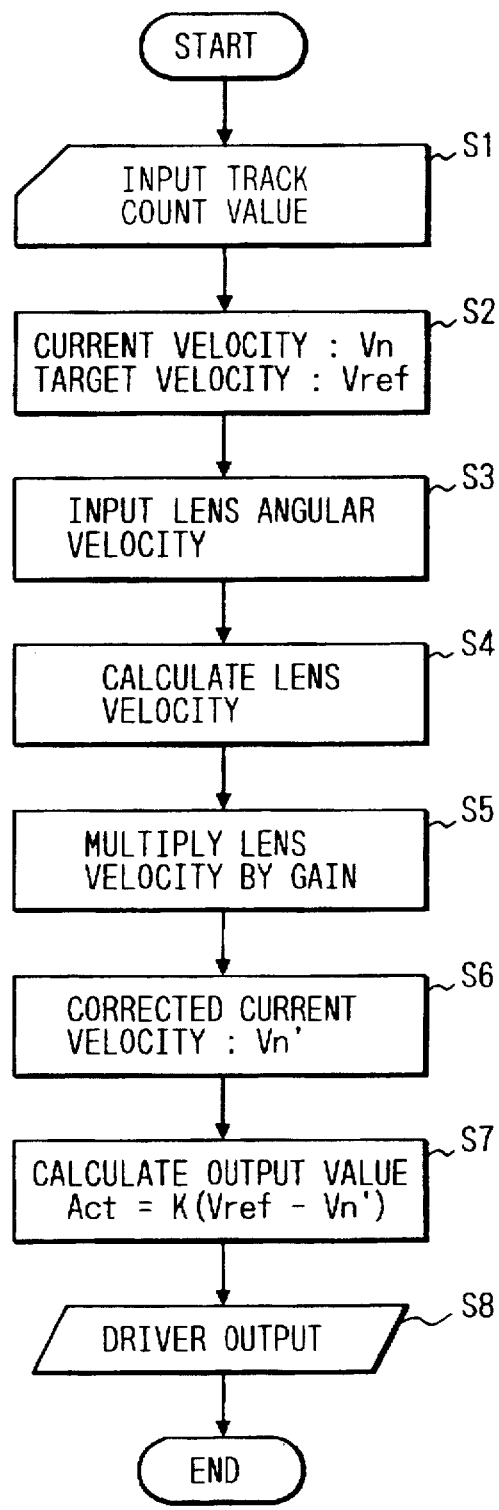
FIG. 8 is a flow chart showing the velocity control operation in the second embodiment in FIG. 6.

FIG. 7 is a chart showing a signal of each portion in FIG. 6. FIG. 7(a) shows a target velocity and the detected velocity of the optical head, FIG. 7(b) shows a driving current for a linear motor, and FIG. 7(c) shows an output from the lens angular velocity detector 16. FIG. 8 is a flow chart showing the process of velocity control, and shows the velocity control routine executed at a period of 4 kHz. A basic velocity control operation is the same as in the first embodiment in FIG. 3, and a detailed description thereof will be omitted. A correcting operation of the seek velocity by using the lens angular velocity will be described below. Referring to FIG. 8, after the current and target velocities are detected, the DSP 8 introduces an output from the lens angular velocity detector 16 (S3), and calculates the lens velocity on the basis of the lens angular velocity (S4). That is, the moving velocity in the radial direction of the lens is calculated from the rotational angular velocity of the objective lens, thereby obtaining a variation in detected velocity caused by a disturbance. A lens velocity $V_L$ is represented by the following equation.

$$V_L = X \cdot L \; [m/sec] \qquad (7)$$

where X is the angular velocity [rad/s], and L is the distance |m| between the rotational center of the lens and the lens position.

The DSP 8 multiplies the obtained lens velocity by a correction gain k (S5), thereby correcting the detected velocity $V_n$ on the basis of the lens velocity (S6). The corrected velocity $V_n'$ can be obtained in accordance with equation (6). For example, at a point B in FIG. 7(a), a velocity $V_B$ is detected upon vibration of the actuator. However, since a rotational angular velocity b of the lens is detected at the point B, as shown in FIG. 7(c), the corrected velocity $V_n'$ at the point B is $V_n - (V_B - k \cdot b \cdot L)$. The DSP 8 calculates a command value by using the obtained corrected velocity (S7), and outputs it to a driver 10 (S8). Also in this embodiment, whenever the velocity is detected, the detected velocity is corrected on the basis of the lens angular velocity, and the velocity of the optical head is controlled by a velocity signal from which the influence of the vibration is eliminated. Therefore, as in the first embodiment in FIG. 3, even when a vibration is generated to the actuator, no instability occurs in control, so that stable seek control can be performed.

Figure 9:
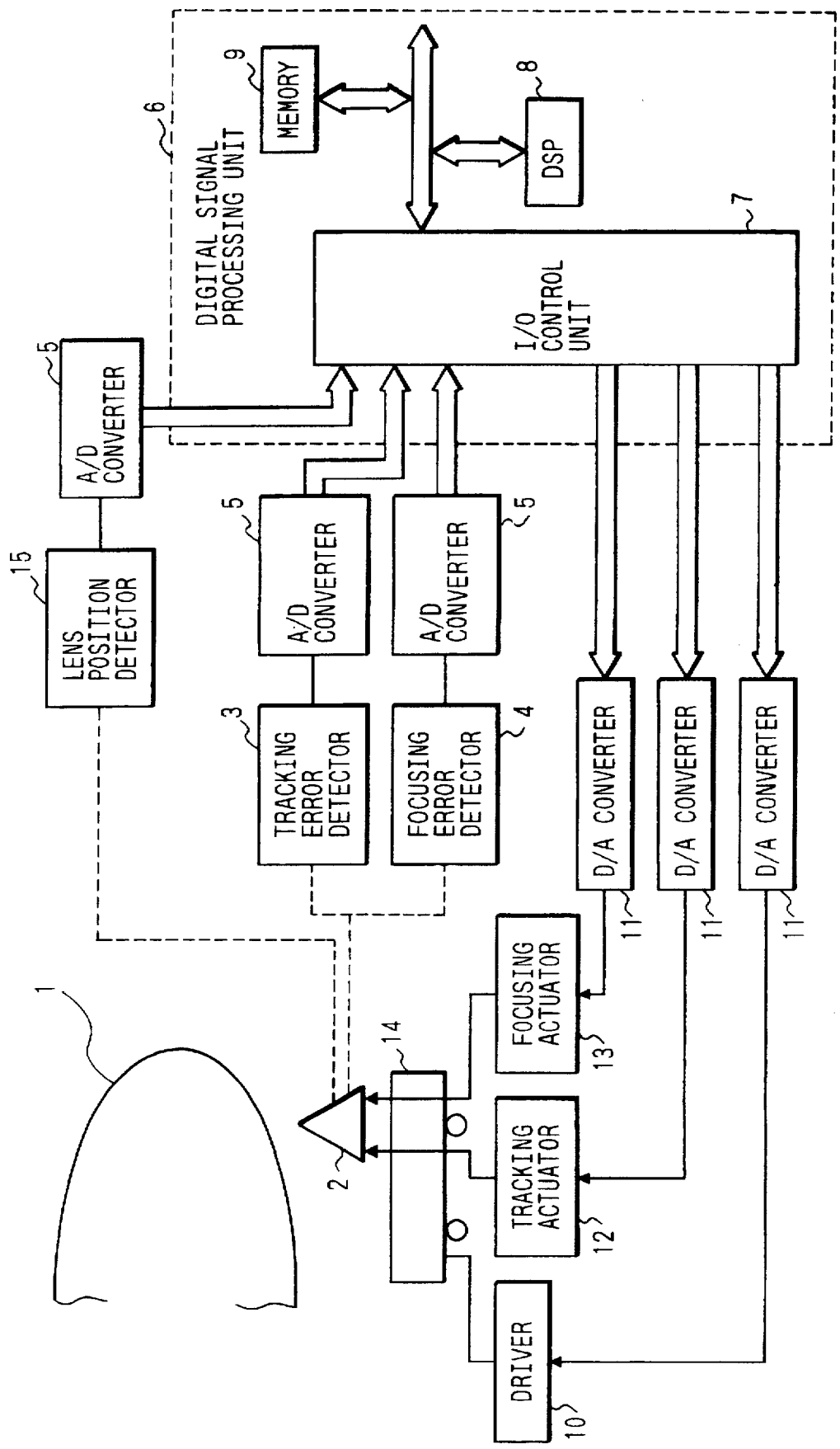
FIG. 9 is a block diagram showing an information recording/reproducing apparatus according to the third embodiment of the present invention.
Figure 10A:
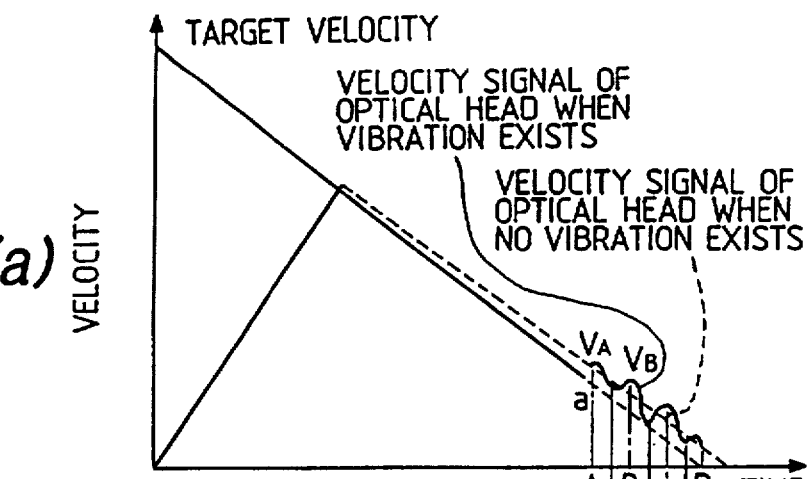
FIGS. 10(a) through 10(e) are timing charts showing the relationship between a target velocity and a detected velocity, a driving current for a linear motor, an output from a lens position detector, a lens position after cancellation of an eccentric component, and an obtained lens velocity.
Figure 10B:
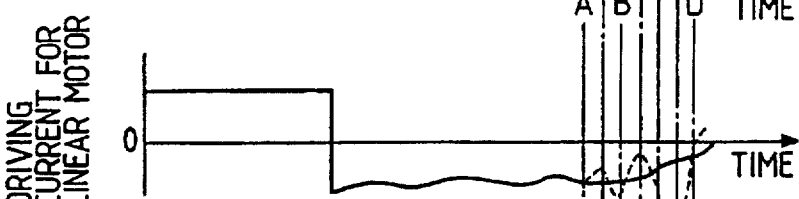
Figure 10C:
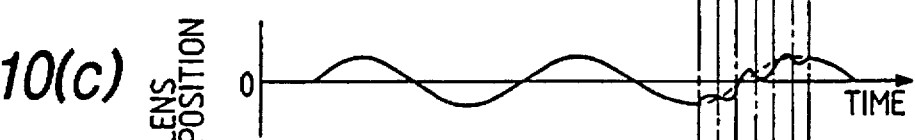
Figure 10D:
Figure 10E:
Figure 11:
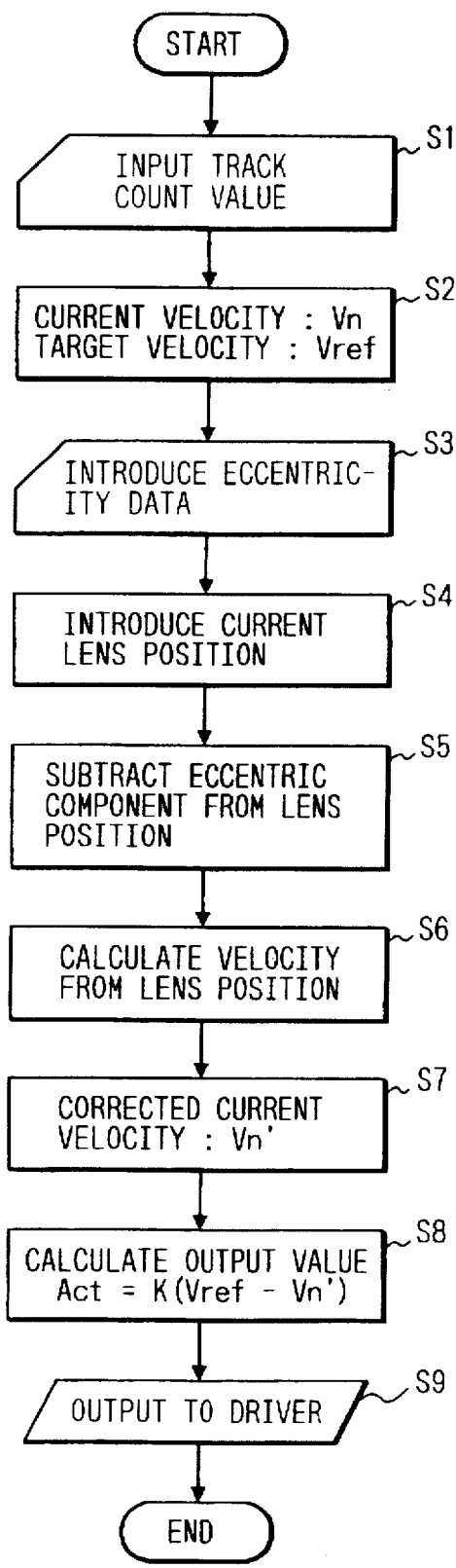
FIG. 11 is a flow chart showing the velocity control operation in the third embodiment in FIG. 9.

The third embodiment of the present invention will be described below with reference to FIGS. 9 to 11. FIG. 9 is a block diagram showing an information recording/reproducing apparatus according to the third embodiment. The arrangement is the same as in FIG. 3, and a detailed description thereof will be omitted.

An operation will be described below with reference to FIGS. 10(a) through 10(e) and 11. FIGS. 10(a) through 10(e) are charts showing a signal of each portion during the seek operation of the optical head. FIG. 10(a) is a chart showing a velocity profile (operation schedule velocity curve to a target position) during the seek operation and the actually detected velocity signal. Two velocity signals are shown in FIG. 10(a). One is a velocity signal obtained when a tracking actuator 12 is vibrated, and the other is a signal obtained when no vibration exists. FIG. 10(b) shows a driving current for a linear motor 14 during the seek operation, and FIG. 10(c) shows the position of the objective lens detected by a lens position detector 15. When an optical disk 1 is rotated at a predetermined rotational period, the center of the optical disk 1 is shifted from the rotational center to cause eccentricity. This eccentricity affects the relative positional relationship between the optical head and the optical disk 1. For example, even when the linear motor 14 is operated at a predetermined velocity, and the tracking actuator 12 is fixed to the mechanical center, the relative velocity between the optical head and the disk surface is not a predetermined value, and the velocity curve undulates with velocity deviations at a predetermined period caused by eccentricity. A curve representing the lens position shown in FIG. 10(c) undulates at a predetermined period because of the influence of eccentricity. FIG. 10(d) shows the lens position after the eccentric component is eliminated, and FIG. 10(e) shows the lens velocity obtained from the lens position in FIG. 10(d). FIG. 11 is a flow chart showing the process of a DSP 8 during the seek operation of the optical head, and shows the interrupt routine executed, e.g., at a period of 4 kHz.

When a recording/reproducing command is issued from an external controller (not shown) and the recording/reproduction position of the optical disk 1 is designated, a digital signal processing unit 6 calculates a remaining distance from the current position and the target position of the optical head to start control of the seek operation to the target position. In velocity control during the seek operation, the DSP 8 detects the velocity of the optical head as described above and calculates the command value to the linear motor 14 every predetermined period on the basis of the obtained velocity and the target velocity to execute velocity control of the optical head. In more detail, as shown in FIG. 11, the DSP 8 inputs, from a counter (not shown), a track count value which is the number of information tracks of the optical disk 1 intersected by the light beam (S1), and calculates a current velocity $V_n$ and a target velocity $V_{ref}$ on the basis of the track count value (S2). Calculation of the current velocity $V_n$ is performed by the track count method in the low velocity range or the intertrack count method in the high velocity range as described above. The DSP 8 calculates the target velocity $V_{ref}$ in accordance with equation (1) on the basis of the track count value. However, for example, assuming that the track count value is $N_2$, the target velocity $V_{ref}$ can be obtained in accordance with equation (5) described above.

The DSP 8 introduces the current eccentric data obtained from the rotational period of a spindle motor (not shown) for rotating the optical disk 1 (S3), and stores it in a memory 9. This eccentric data can be a component corresponding to one revolution of the spindle motor, and its resolution can be arbitrarily set depending on application precision. When introduction of the eccentric data is finished, the DSP 8 introduces the current lens position detected by the lens position detector 15 (S4), and subtracts the eccentric data stored in the memory 9 from the obtained lens position to obtain a component from which the displacement of the lens caused by eccentricity is eliminated (S5). Therefore, the lens position without being affected by eccentricity can be obtained, as shown in FIG. 10(d).

That is, in order to effectively eliminate the effect of the eccentricity, the displacement of the lens position of the tracking actuator 12, which is caused by eccentricity, is measured beforehand. The displacement of the lens position caused by eccentricity is applied to the tracking actuator 12 in synchronism with the rotational period of the spindle motor during the seek operation. Therefore, a periodical velocity deviation caused by eccentricity, which is in synchronism with the rotational period of the spindle motor, is eliminated when the lens is driven by the tracking actuator 12 to follow the eccentricity, and does not affect the velocity control of the linear motor 14. If there is a sufficient velocity control band of the linear motor 14, the tracking actuator 12 can be fixed to the mechanical center, and a velocity displacement caused by eccentricity may be followed and controlled by the linear motor 14.

The DSP 8 calculates the lens velocity on the basis of the obtained lens position (S6). This can be obtained as a difference between the previously introduced lens position and the newly introduced lens position. The DSP 8 then multiplies the obtained value by the correction gain of the detected velocity by the lens velocity, thereby correcting the detected velocity $V_n$ by the lens velocity $V_L$ (S7). The corrected velocity $V_n'$ can be obtained in accordance with equation (6).

The DSP 8 corrects the detected velocity, i.e., the fluctuation component of the detected velocity generated by vibration of the actuator, and calculates the command value to the linear motor 14 by using the obtained corrected value (S8). This command value is calculated in accordance with equation (2), converted into an analog value by a D/A converter 11, and transmitted to a driver 10 to drive the linear motor 14 (S9). A series of control operations of the DSP 8 are thus completed, and the same process is repeated in the next control period. The DSP 8 repeats the same process at a period of, e.g., 4 kHz. As a result, an acceleration current is supplied to the linear motor 14, as shown in FIG. 10(b), and the optical head is accelerated to the target velocity, as shown in FIG. 10(a). When the target velocity is reached, a deceleration current is supplied to the linear motor 14, and the optical head is decelerated while following the target velocity.

Assume that the tracking actuator 12 is vibrated by some disturbance at a point A in FIG. 10(a). By the vibration, the objective lens arranged in the optical system 2 is not fixed at the center and is set in a vibrated state, as shown in FIG. 10(c). A velocity $V_A$ is detected at the point A and a velocity $V_B$ is detected at a point B because of this vibration. As shown in FIG. 10(e), when lens velocities a and b are subtracted from the detected velocities $V_A$ and $V_B$, respectively, the detected velocity can be corrected. Therefore, the obtained corrected velocity is an exact relative velocity between the optical head and the surface of the disk, and the vibration component of the objective lens is eliminated. In this case, the lens position actually includes an eccentric component, as shown in FIG. 10(c). However, since the actuator is driven to follow the eccentricity as described above, the eccentric component of the lens position is eliminated, so that a more exact velocity can be obtained as a relative velocity. At a point D in FIG. 10(a), the DSP 8 switches the detection method of the optical head velocity from the track count method to the intertrack count method. When several tens of tracks remain up to the target, coarse-seek control of the optical head by the linear motor 14 is switched to fine-seek control of the light beam by the tracking actuator 12. When the light beam reaches the target track, the light beam is finally focused on the target track to record/reproduce information on/from the target track.

As described above, in this embodiment, the lens velocity in the vibrated state of the actuator is detected to correct the current velocity. In addition, the displacement of the lens caused by eccentricity of the optical disk is measured and applied to the actuator in synchronism with the rotational period of the disk, thereby exactly correcting the velocity of the head regardless of the vibration of the actuator caused by any disturbance or eccentricity of the optical disk. A correct velocity can be detected regardless of a disturbance or eccentricity, so that vibration of the current as indicated by a broken line in FIG. 10(b) is eliminated. Therefore, stable control can be performed without causing any instability in velocity control.

The above-described embodiments exemplify an optical disk recording/reproducing apparatus. However, the present invention is not limited to this, and can be used for seek control of the head in a magnetic disk drive.

As described above, according to the present invention, a variation in detection value of the seek velocity, which is caused by a vibration of a fine actuator generated by a disturbance, is corrected, thereby eliminating instability of velocity control and performing stable seek control.

In addition, according to the present invention, a variation in detection value of the seek velocity, which is caused by a vibration of a fine actuator generated by a disturbance, is corrected, and an eccentric component of the recording medium is applied in synchronism with the rotational period of the recording medium, thereby eliminating instability of velocity control and performing stable seek control regardless of the vibration of the moving means, which is caused by a disturbance, or of eccentricity of the medium.

What is claimed is:

1. An information recording and/or reproducing apparatus comprising:

first moving means for causing a recording and/or reproducing head to perform a coarse seek to a position near a target position of an information recording medium;

second moving means, provided in the head, for causing a recording/reproducing portion to perform a fine seek to the target position of the recording medium;

first detecting means for detecting a moving velocity of said head moved by said first moving means, the moving velocity containing a vibration component of the recording/reproducing portion;

second detecting means for detecting the vibration component of the recording/reproducing portion;

correcting means for calculating a corrected velocity of the head by subtracting a detection value of said second detecting means from a detection value of said first detecting means; and control means for controlling said first moving means on the basis of the corrected velocity.

2. An information recording and/or reproducing apparatus according to claim 1, wherein said second detecting means detects the vibration component of the recording/reproducing portion when said first moving means causes said head to perform the coarse seek.

3. An information recording and/or reproducing apparatus according to claim 1, wherein said second moving means does not operate when said first moving means causes said head to perform the coarse seek.

4. An information recording and/or reproducing apparatus comprising:

first moving means for causing a recording and/or reproducing head to perform a coarse seek to a position near a target position of an information recording medium;

second moving means, provided in the recording and/or reproducing head, for causing a recording/reproducing portion to perform a fine seek to the target position of the recording medium;

first detecting means for detecting a moving velocity of the head moved by said first moving means, the moving velocity containing a vibration component of the recording/reproducing portion;

second detecting means for detecting a moving velocity of the recording/reproducing portion caused by vibration of the recording/reproducing portion;

correcting means for calculating a corrected velocity of the head in which the vibration component of the recording/reproducing portion is eliminated, by subtracting a detection value of said second detecting means from a detection value of said first detecting means; and control means for controlling said first moving means on the basis of the corrected velocity.

5. An apparatus according to claim 4, wherein said second detecting means detects the moving velocity from a difference in displacement of the recording/reproducing portion.

6. An apparatus according to claim 4, wherein said second detecting means detects the moving velocity from an angular velocity of a displacement of the recording/reproducing portion.

7. An apparatus according to claim 4, wherein said correcting means subtracts the detection value from said second detecting means from the detection value from said first detecting means to correct a detected velocity.

8. An information recording and/or reproducing apparatus according to claim 4, wherein said second detecting means detects the moving velocity of the recording/ reproducing portion when said first moving means causes said head to perform the coarse seek.

9. An information recording and/or reproducing apparatus according to claim 4, wherein said second moving means does not operate when said first moving means causes said head to perform the coarse seek.

10. An information recording and/or reproducing apparatus comprising:

first moving means for causing a recording and/or reproducing head to perform a coarse seek to a position near a target position of an information recording medium;

second moving means for causing an objective lens provided in the head to perform a fine seek to the target position of the recording medium;

first detecting means for detecting a moving velocity of the head moved by said first moving means, the moving velocity containing a vibration component of the objective lens;

second detecting means for detecting a moving velocity of the objective lens caused by vibration of the objective lens;

correcting means for calculating a corrected velocity of the head in which the vibration component of the objective lens is eliminated, by subtracting a detection value of said second detecting means from a detection value of said first detecting means; and control means for controlling said first moving means on the basis of the corrected moving velocity.

11. An information recording and/or reproducing apparatus according to claim 10, wherein said second detecting means detects the moving velocity of the objective lens when said first moving means causes said head to perform the coarse seek.

12. An information recording and/or reproducing apparatus according to claim 10, wherein said second moving means does not operate when said first moving means causes said head to perform the coarse seek.

13. An information recording and/or reproducing apparatus comprising:

first moving means for causing a recording and/or reproducing head to perform a coarse seek to a position near a target position of an information recording medium;

second moving means, provided in the head, for causing a recording/reproducing portion to perform a fine seek to the target position of the recording medium;

first detecting means for detecting a moving velocity of the head moved by said first moving means;

second detecting means for detecting a moving velocity of the recording/ reproducing portion caused by vibration of the recording/ reproducing portion when the coarse seek is performed by said first moving means;

third detecting means for detecting an eccentric amount of the recording medium;

correcting means for calculating a corrected velocity of the head on the basis of a detection value from said first detecting means, a detection value from said second detecting means and a detection value from said third detecting means; and control means for controlling said first moving means on the basis of the corrected moving velocity.

14. An apparatus according to claim 13, wherein said second detecting means detects the moving velocity from a difference in displacement of the recording/reproducing portion.

15. An information recording and/or reproducing apparatus comprising:

first moving means for causing a recording and/or reproducing head to perform a coarse seek to a position near a target position of an information recording medium;

second moving means for causing an objective lens provided in said head to perform a fine seek to the target position of the recording medium;

first detecting means for detecting a moving velocity of said head moved by said first moving means;

second detecting means for detecting a moving velocity of said objective lens caused by vibration of said objective lens when the coarse seek is performed by said first moving means;

third detecting means for detecting an eccentric amount of the information recording medium;

correcting means for calculating a corrected velocity of said head on the basis of a detection value of said first detecting means, a detection value of said second detecting means and a detection value of said third detecting means; and control means for controlling said first moving means on the basis of the corrected moving velocity.

16. An information recording and/or reproducing apparatus comprising:

first moving means for causing a recording and/or reproducing head to perform a coarse seek to a position near a target position of an information recording medium;

second moving means, provided in said head, for causing a recording/reproducing portion to perform a fine seek to the target position of the recording medium;

first detecting means for detecting a moving velocity of said head moved by said first moving means;

second detecting means for detecting a vibration component of the recording/reproducing portion when the coarse seek is performed by said first moving means;

third detecting means for detecting an eccentric component of the information recording medium;

correcting means for calculating a corrected velocity of said head by eliminating the eccentric component and the vibration component from a detection value of said first detecting means; and control means for controlling said first moving means on the basis of the corrected moving velocity.

* * * * *

UNITED STATES PATENT AND TRADEMARK OFFICE
CERTIFICATE OF CORRECTION

PATENT NO. : 5,768,226

DATED : June 16, 1998

INVENTOR : TSUKASA OGINO

Page 1 of 2

It is certified that error appears in the above-identified patent and that said Letters Patent is hereby corrected as shown below:

ON THE COVER PAGE

At item [56], under "U.S. PATENT DOCUMENTS", "467,039  12/1892  Meyer" should read --4,627,039  12/1986  Meyer--.

COLUMN 1:

line 32, "FIG." should read --FIGS.--, "is" should be deleted and "graph" should read --graphs--.

COLUMN 2:

line 40, "control-of" should read --control of--; and
line 47, "of" should be deleted.

UNITED STATES PATENT AND TRADEMARK OFFICE
CERTIFICATE OF CORRECTION

PATENT NO. : 5,768,226
DATED : June 16, 1998
INVENTOR : TSUKASA OGINO

It is certified that error appears in the above-identified patent and that said Letters Patent is hereby corrected as shown below:

COLUMN 5 (cont'd):

line 35, "FIG. 4(d)" should read --FIG. 4(c)--;
    line 36, "(d) of FIG. 4" should read --FIG. 4(d)--; and
    line 67, "$V_{ref} = [2 \cdot (S-N_2) \cdot \lambda/2]^{\frac{1}{2}}$" should read
--$V_{ref} = [2 \cdot \alpha(S-N_2) \cdot \lambda/2]^{\frac{1}{2}}$--.

COLUMN 7:

line 4, "FIG. 4(b)." should read --FIG. 4(a).--;
    line 24, "FIG. 7 is a chart" should read --FIGS. 7(a) through 7(c) are charts--; and

COLUMN 8:

line 46, "above" should read --above,--.

Signed and Sealed this

Second Day of March, 1999

Attest:

Q. TODD DICKINSON

*Attesting Officer*     *Acting Commissioner of Patents and Trademarks*